United States Patent
Zhang

(10) Patent No.: US 12,499,253 B2
(45) Date of Patent: Dec. 16, 2025

(54) DATA STREAM PROCESSING METHOD, STORAGE CONTROL NODE, AND NONVOLATILE READABLE STORAGE MEDIUM

(71) Applicant: SUZHOU METABRAIN INTELLIGENT TECHNOLOGY CO., LTD., Jiangsu (CN)

(72) Inventor: Xueqing Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 82 days.

(21) Appl. No.: 18/697,415

(22) PCT Filed: Nov. 24, 2022

(86) PCT No.: PCT/CN2022/134124
§ 371 (c)(1),
(2) Date: Mar. 29, 2024

(87) PCT Pub. No.: WO2023/155526
PCT Pub. Date: Aug. 24, 2023

(65) Prior Publication Data
US 2024/0403455 A1    Dec. 5, 2024

(30) Foreign Application Priority Data
Feb. 17, 2022    (CN) .......................... 202210144052.0

(51) Int. Cl.
G06F 21/00    (2013.01)
G06F 21/60    (2013.01)

(52) U.S. Cl.
CPC .......... *G06F 21/606* (2013.01); *G06F 21/602* (2013.01)

(58) Field of Classification Search
None
See application file for complete search history.

(56) References Cited

U.S. PATENT DOCUMENTS 12,218,923 B1 *    2/2025    Shetty .................... H04L 63/20
2003/0117652 A1    6/2003    Lapstun
(Continued)

FOREIGN PATENT DOCUMENTS

CN    101101699 A    1/2008
CN    101730145 A    6/2010
(Continued)

OTHER PUBLICATIONS

Chinese Search Report for Chinese Patent Application No. 20221014052.0 dated Mar. 22, 2022.
(Continued)

*Primary Examiner* — Andrew J Steinle
(74) *Attorney, Agent, or Firm* — Merchant & Gould P.C.

(57) ABSTRACT

A data stream processing method, a storage control node, and a nonvolatile readable storage medium are provided. The storage control node includes a first Data Processing Unit (DPU) and a second DPU. The method includes: the first DPU receives an Input/Output interface (I/O) request, performs protocol offloading on the I/O request to obtain a data message, and stores the data message in a memory; and the second DPU acquires the data message from the memory and performs data processing on the acquired data message.

20 Claims, 2 Drawing Sheets

(56) References Cited

U.S. PATENT DOCUMENTS

2019/0163493 A1    5/2019   Dubeyko et al.
2021/0250285 A1    8/2021   Noureddine et al.

FOREIGN PATENT DOCUMENTS

| CN | 103973581 A | | 8/2014 | |
|----|---|---|---|---|
| CN | 108009119 A | | 5/2018 | |
| CN | 110892380 A | * | 3/2020 | ........... G06F 9/5027 |
| CN | 111083070 A | | 4/2020 | |
| CN | 112565919 A | | 3/2021 | |
| CN | 113113068 A | | 7/2021 | |
| CN | 113703843 A | | 11/2021 | |
| CN | 114201421 A | | 3/2022 | |
| EP | 1156422 A2 | * | 11/2001 | ............. G06F 13/30 |
| TW | 201816619 A | | 5/2018 | |
| WO | 2013/136857 A1 | | 9/2013 | |

OTHER PUBLICATIONS

Chinese Search Report for Chinese Patent Application No. 20221014052.0 dated Apr. 12, 2022.
International Search Report and Written Opinion for International Patent Application No. PCT/CN2022/134124 mailed Feb. 16, 2023.

\* cited by examiner

DATA STREAM PROCESSING METHOD, STORAGE CONTROL NODE, AND NONVOLATILE READABLE STORAGE MEDIUM

CROSS-REFERENCE TO RELATED APPLICATION

The present disclosure is a National Stage Filing of the PCT International Application No. PCT/CN2022/134124 filed on Nov. 24, 2022, which claims priority to Chinese Patent Application No. 202210144052.0, filed with the China National Intellectual Property Administration (CNIPA) on Feb. 17, 2022 and entitled "DATA STREAM PROCESSING METHOD, STORAGE CONTROL NODE, AND READABLE STORAGE MEDIUM", which is incorporated herein by reference in its entirety.

TECHNICAL FIELD

The present disclosure relates to the technical field of data stream processing, and in particular, to a data stream processing method, a storage control node, and a nonvolatile readable storage medium.

BACKGROUND

Current market demands drive a global storage data volume to increase sharply at a Zetta byte (which is short as ZB and equal to ten trillion bytes) level. The performance of a single storage hard disk, an access bandwidth of an internal Central Processing Unit (CPU) to an internal memory, and a network interface bandwidth used for storage are significantly improved. Customers also pose higher demands on the performance of an Input/Output interface (I/O) of a storage system.

A currently mainstream framework for the storage system is an architecture centered on CPU computing, and is applicable to a traditional usage scenario of storage devices. The architecture is centered on a CPU and mounts computing, storage and communication devices such as a front-end interface card, a Graphics Processing Unit (GPU), an internal memory, a Field Programmable Gate Array (FPGA), a Hard Disk Drive (HDD), a Solid State Disk (SSD) under the CPU, so that all the computation and control are initiated by the CPU. However, with the advent of the post-Moore era, the computing capability of a single core of the CPU has stagnated, and the framework centered on the CPU cannot process an I/O data stream better and faster, which has become a bottleneck in improving the performance of the storage system.

To sum up, how to improve the processing efficiency and performance of a data stream is a technical problem that needs to be urgently resolved by a person having ordinary skill in the art.

SUMMARY

In view of this, embodiments of the present disclosure provide a data stream processing method, a storage control node, and a nonvolatile readable storage medium, which may improve processing efficiency and processing performance of a data stream.

The embodiments of the present disclosure provide the following technical solutions.

The embodiments of the present disclosure provide a data stream processing method, where a storage control node includes a first Data Processing Unit (DPU) and a second DPU, and the data stream processing method includes:
  receiving, by the first DPU, an I/O request, performing, by the first DPU, protocol offloading on the I/O request to obtain a data message, and storing, by the first DPU, the data message in a memory; and
  acquiring, by the second DPU, the data message from the memory and performing, by the second DPU, data processing on the acquired data message.

In some exemplary embodiments, storing, by the first DPU, the data message in the memory includes:
  determining, by the first DPU, a type of data contained in the data message, and storing, by the first DPU, the data message in a corresponding memory according to the type of the data contained in the data message.

In some exemplary embodiments, determining, by the first DPU, the type of data contained in the data message includes:
  performing, by the first DPU, data fingerprint calculation on the data message to obtain a data fingerprint of the data message; and
  determining, by the first DPU according to the data fingerprint, the type of the data contained in the data message.

In some exemplary embodiments, storing, by the first DPU, the data message in the memory includes:
  storing, by the first DPU, the data message in the memory through a high-speed interconnection bus.

In some exemplary embodiments, acquiring, by the second DPU, the data message from the memory and performing, by the second DPU, the data processing on the acquired data message includes:
  acquiring, by the second DPU, the data message from the memory through the high-speed interconnection bus, and performing, by the second DPU, at least one of erasure processing, encryption processing, compression processing, deduplication processing, and data consistency protection processing on the acquired data message.

In some exemplary embodiments, the data stream processing method further includes:
  performing, by a CPU in the storage control node, data forwarding control and storage management.

The embodiments of the present disclosure provide a storage control node, including a first DPU and a second DPU, where
  the first DPU is configured to receive an I/O request, perform protocol offloading on the I/O request to obtain a data message, and store the data message in a memory; and
  the second DPU is configured to acquire the data message from the memory and perform data processing on the acquired data message.

In some exemplary embodiments, the first DPU is configured to determine a type of data contained in the data message, and store the data message in a corresponding memory according to the type of the data contained in the data message.

In some exemplary embodiments, the storage control node further includes a CPU, where
  the CPU is configured to perform data forwarding control and storage management.

The embodiments of the present disclosure provide a nonvolatile readable storage medium, where the nonvolatile readable storage medium stores a computer program, and the computer program, when being executed by a processor, causes the processor to implement operations of the data stream processing method in any one of the foregoing.

The embodiments of the present disclosure provide a data stream processing method, a storage control node, and a nonvolatile readable storage medium. The storage control node includes a first DPU and a second DPU. The data stream processing method includes: receiving, by a first DPU, an I/O request, performing protocol offloading on the I/O request to obtain a data message, and storing the data message in a memory; and acquiring, by a second DPU, the data message from the memory and performing data processing on the acquired data message.

In the foregoing technical solution disclosed in the embodiments of the present disclosure, the first DPU and the second DPU are deployed in the storage control node, the first DPU performs I/O request reception, protocol offloading, and data message storage, and the second DPU acquires the stored data message and performs data processing on the data message, that is, data stream processing is dedicatedly performed by using the first DPU and the second DPU, so that the processing efficiency of the data stream may be improved, and the processing performance of the data stream may be improved.

BRIEF DESCRIPTION OF THE DRAWINGS

To describe the technical solutions in embodiments of the present disclosure or in the conventional technology more clearly, the following briefly describes the accompanying drawings for describing embodiments or the conventional technology. Apparently, the accompanying drawings in the following descriptions show merely the embodiments of the present disclosure, and a person having ordinary skill in the art may still derive other drawings from accompanying drawings without creative efforts.

DETAILED DESCRIPTION

Current market demands drive a global storage data volume to increase sharply at a ZB level. The performance of a single storage hard disk, an access bandwidth of an internal CPU to an internal memory, and a network interface bandwidth used for storage are significantly improved. Customers also pose higher demands (higher bandwidth, higher Input/Output Operations Per Second (IOPS), and lower latency) on the performance of an I/O of a storage system. However, in the post-Moore era, the development of the semiconductor process technology has slowed down, and the computing capability of a single core has stagnated (the rate of improvement decreases from 52% to 3.5%), which have brought huge challenges to the performance improvement in the design of a storage system.

A currently mainstream framework for the storage system is an architecture centered on CPU computing, and is applicable to a traditional usage scenario of storage devices. The architecture is centered on a CPU and mounts computing, storage and communication devices such as a front-end interface card, an GPU, an internal memory, an FPGA, an HDD, an SSD under the CPU, so that all the computation and control are initiated by the CPU. However, with the advent of the post-Moore era, the computing capability of a single core of the CPU has stagnated, and the framework centered on the CPU cannot process an I/O data stream better and faster, which has become a bottleneck in improving the performance of the storage system.

Therefore, the embodiments of the present disclosure provide a data stream processing method, a storage control node, and a nonvolatile readable storage medium, which may improve the processing efficiency and processing performance of a data stream.

The following clearly and completely describes the technical solutions in the embodiments of the present disclosure with reference to the accompanying drawings in the embodiments of the present disclosure. Apparently, the described embodiments are only a part rather than all of the embodiments of the present disclosure. All other embodiments obtained by a person having ordinary skill in the art based on the embodiments of the present disclosure without creative efforts shall fall within the protection scope of the present disclosure.

Figure 1:
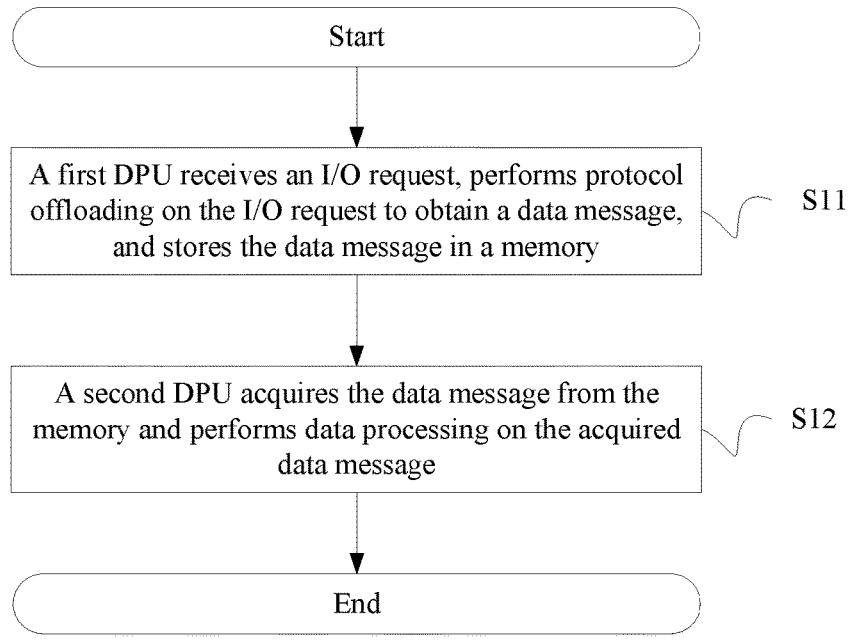
FIG. 1 is a flowchart of a data stream processing method according to an embodiment of the present disclosure.
Figure 2:
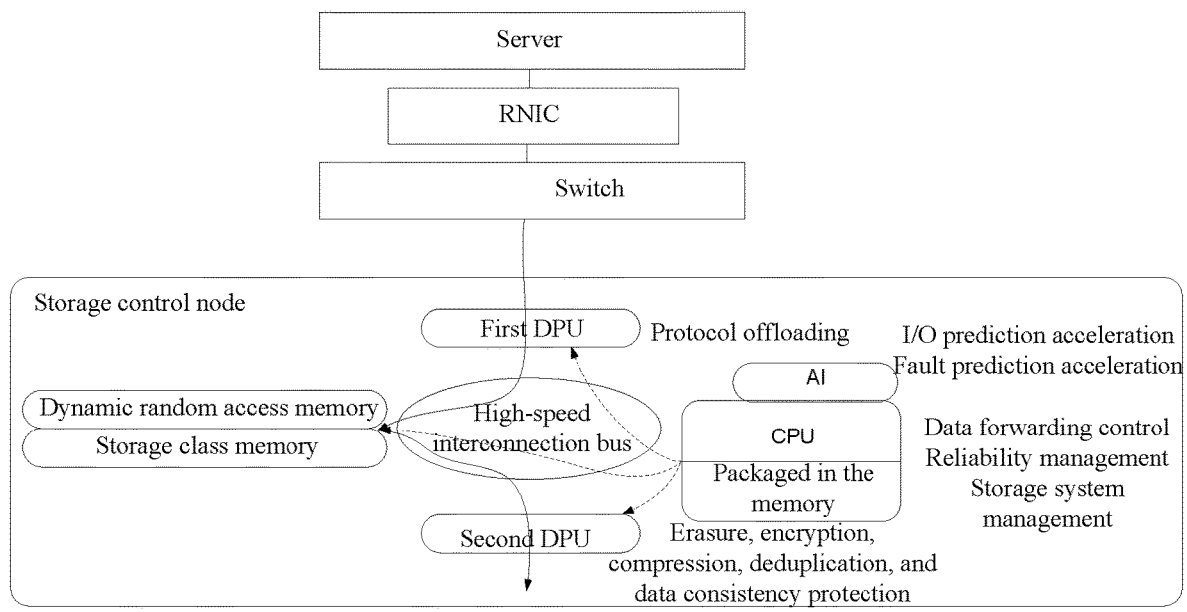
FIG. 2 is a schematic diagram of an architecture of a storage control node according to an embodiment of the present disclosure.

Refer to FIG. 1 and FIG. 2. FIG. 1 is a flowchart of a data stream processing method according to an embodiment of the present disclosure. FIG. 2 is a schematic diagram of an architecture of a storage control node according to an embodiment of the present disclosure. In the data stream processing method according to the embodiment of the present disclosure, the storage control node may include a first DPU and a second DPU. The data stream processing method may include the following operations S11 to S12.

At S11, the first DPU receives an I/O request, performs protocol offloading on the I/O request to obtain a data message, and stores the data message in a memory.

The storage control node included in a storage system is a type of independent physical device, mainly achieves functions such as receiving and responding to the I/O request (including, e.g., a read operation and a write operation) from a server, data organization (deduplication, compression, encryption, erasure), ensuring data consistency, performing data forwarding control and reliability control, and conducting storage system management. In the embodiments of the present disclosure, in addition to a CPU, the storage control node may also include at least the first DPU and the second DPU, and the first DPU and the second DPU may be used to implement data stream processing. It should be noted that a Remote Direct Memory Access Network Interface Card (RNIC, which is an RDMA enabled Network Interface Controller) and a switch shown in FIG. 2 are configured to transmit the I/O request sent by the server to the storage control node. It should be noted that in FIG. 2, solid line streams are corresponding to data streams, and dotted line streams are corresponding to control streams.

In some exemplary embodiments, the first DPU in the storage control node implements receiving and responding to the I/O request sent by the server. During this process, the first DPU performs protocol offloading on a data packet in the received I/O request, for example, the first DPU may perform unpacking, parsing, verification, and other operations on the data packet so as to obtain the data message. The first DPU may implement offloading of network protocols such as a Transmission Control Protocol (TCP) and NVMe over Fabrics (NVMe-oF, a relatively new protocol specification designed to use NVMe to connect a host to a memory through a network structure) by using internal hardware. Of course, offloading of other protocols may also be implemented.

Compared with the related art in which a CPU is responsible for network protocol offloading and the CPU performs unpacking, parsing, verification, and other operations on a data packet, which consumes a large number of computing resources of the CPU, the embodiments of the present disclosure proposes to adopt a DPU dedicatedly configured to perform data processing to perform protocol offloading, so as to reduce the consumption of computing resources of the CPU and improve protocol offloading efficiency.

After obtaining the data message through protocol offloading, the first DPU may store the data message in the memory. This process is implemented by using a Peer to Peer (P2P) Direct Memory Access (DMA) technology. The memory mentioned herein may be a Dynamic Random Access Memory (DRAM) or an Storage Class Memory (SCM). Of course, the memory may alternatively be another type of memory, which is not limited in the embodiments of the present disclosure.

Protocol offloading and data message storage are performed by using the first DPU, so as to facilitate subsequent processing of the data message. In addition, the foregoing process is implemented by using the DPU, so that the processing efficiency and processing performance of the data stream may be improved, a data processing volume of the CPU in the storage control node may be reduced, and a pressure on the CPU may be reduced.

At S12, the second DPU acquires the data message from the memory and performs data processing on the acquired data message.

Considering that there is a need for data processing in the storage control node, the second DPU may be used to acquire the data message from the memory and process the acquired data message. The second DPU may perform hardware acceleration on the data processing of the data message by using a built-in data stream acceleration engine, which may achieve optimization and performance improvement of a fast data path. Compared with the related art in which a plurality of accelerators are required simultaneously to implement data processing centered on a CPU, the embodiments of the present disclosure directly adopt the DPUs dedicatedly configured for data processing to perform hardware acceleration on the data processing in a hardware manner by using the built-in data stream acceleration engine, which may achieve optimization and performance improvement of a fast data path, improve data processing efficiency, and reduce data processing complexity.

It may be learned from the foregoing process that data stream processing in the embodiments of the present disclosure is centered on DPUs, the DPUs are discretely arranged at a plurality of points during data stream processing, so as to implement a variety of I/O hardware acceleration technologies. In addition, since the DPUs are used to implement the data stream processing, that is, data stream processing is separated from other functions, and the DPUs, instead of the CPU, are used to dedicatedly implement data stream processing, which may not only reduce a processing pressure on the CPU, but also complete a streaming fast path within a short time period, improving the processing efficiency and performance of the data stream.

In the foregoing technical solution disclosed in the embodiments of the present disclosure, the first DPU and the second DPU are deployed in the storage control node, the first DPU performs I/O request reception, protocol offloading, and data message storage, and the second DPU acquires the stored data message and performs data processing on the data message, that is, data stream processing is dedicatedly performed by using the first DPU and the second DPU, so that the processing efficiency of the data stream may be improved, and the processing performance of the data stream may be improved.

In the data stream processing method provided in an embodiment of the present disclosure, the operation that the first DPU stores the data message in the memory may include:
the first DPU determines a type of data contained in the data message, and stores the data message in a corresponding memory according to the type of the data contained in the data message.

In the related art, a media used by an existing CPU is designated or agreed in advance when the data message is stored, this will cause data in the DRAM to be lost after a computer is powered off if all data messages are designated or agreed in advance to be stored in the DRAM, or cause a requirement for storage of a large amount of data to be not met because of a limited data storage volume in the SCM if all data messages are designated or agreed in advance to be stored in the SCM. For this reason, in the embodiments of the present disclosure, when the first DPU stores the data message in the memory, the type of the data contained in the data message may be determined. Then, according to the type of the data contained in the data message, the data message is stored in a memory corresponding to the type of data, that is, different data messages are stored in different memories in real time, thereby achieving optimization of a fast data path and improving the rationality and reliability of data storage. In other words, in the embodiments of the present disclosure, the first DPU may select a memory to store data. Take the DRAM or SCM as an example, the DRAM or SCM may be selected to store the data according to the type of the data contained in the data message. Compared with the DRAM, the SCM has a non-volatile property, and data stored on the SCM is not lost even in case of power-off. Therefore, it is more effective and more reliable for data (such as metadata and the like) with a high storage reliability requirement to be stored in the SCM than being stored in the DRAM, and data with a low storage reliability requirement may be stored in the DRAM.

In the data stream processing method provided in an embodiment of the present disclosure, the operation that the first DPU determines the type of the data contained in the data message may include:
the first DPU performs data fingerprint calculation on the data message and obtains a data fingerprint of the data message; and
the first DPU determines, according to the data fingerprint, the type of the data contained in the data message.

In the embodiments of the present disclosure, when determining the type of the data contained in the data message, the first DPU may perform data fingerprint calculation on the data message (for example, using a Message Digest Algorithm MD5 (MD5 algorithm), a Secure Hash Algorithm (SHA1 algorithm), and the like) to obtain the data fingerprint of the data message. Afterwards, the type of the data contained in the data message may be determined according to the calculated data fingerprint, so that different data messages may be stored in different memories according to the type of the data.

In the foregoing manner, the type of data may be accurately determined, so as to better store different data messages in different memories.

In the data stream processing method provided in an embodiment of the present disclosure, the operation that the first DPU stores the data message in the memory may include:

The first DPU stores the data message in the memory through a high-speed interconnection bus.

In the embodiments of the present disclosure, the high-speed interconnection bus may be deployed in the storage control node, and the first DPU may store the data message in the memory through the high-speed interconnection bus, so as to implement sharing of the data message through the high-speed interconnection bus, and reduce the number of times for which the data message is transported during data stream processing, thereby improving the efficiency of data stream processing and reducing the complexity of data stream processing.

In the data stream processing method provided in an embodiment of the present disclosure, the operation that the second DPU acquires the data message from the memory includes:

the second DPU acquires the data message from the memory through the high-speed interconnection bus, and performs at least one of erasure processing, encryption processing, compression processing, deduplication processing, and data consistency protection processing on the acquired data message.

In the related art, the CPU is centered, a plurality of accelerators is needed while the data message is acquired and processed, which causes a large number of internal memory access operations and data transport operations, leading to problems such as low efficiency and poor performance. Compared with the related art, the second DPU in the embodiments of the present disclosure may obtain the data message through the high-speed interconnection bus, and perform at least one of erasure processing, encryption processing, compression processing, deduplication processing, and data consistency protection processing on the data message through the high-speed interconnection bus and by using the data stream acceleration engine built in the second DPU, so as to implement data sharing, reduce data transport and occupation of CPU resources, improve data processing efficiency and processing performance, and reduce the complexity of data processing.

Figure 3:
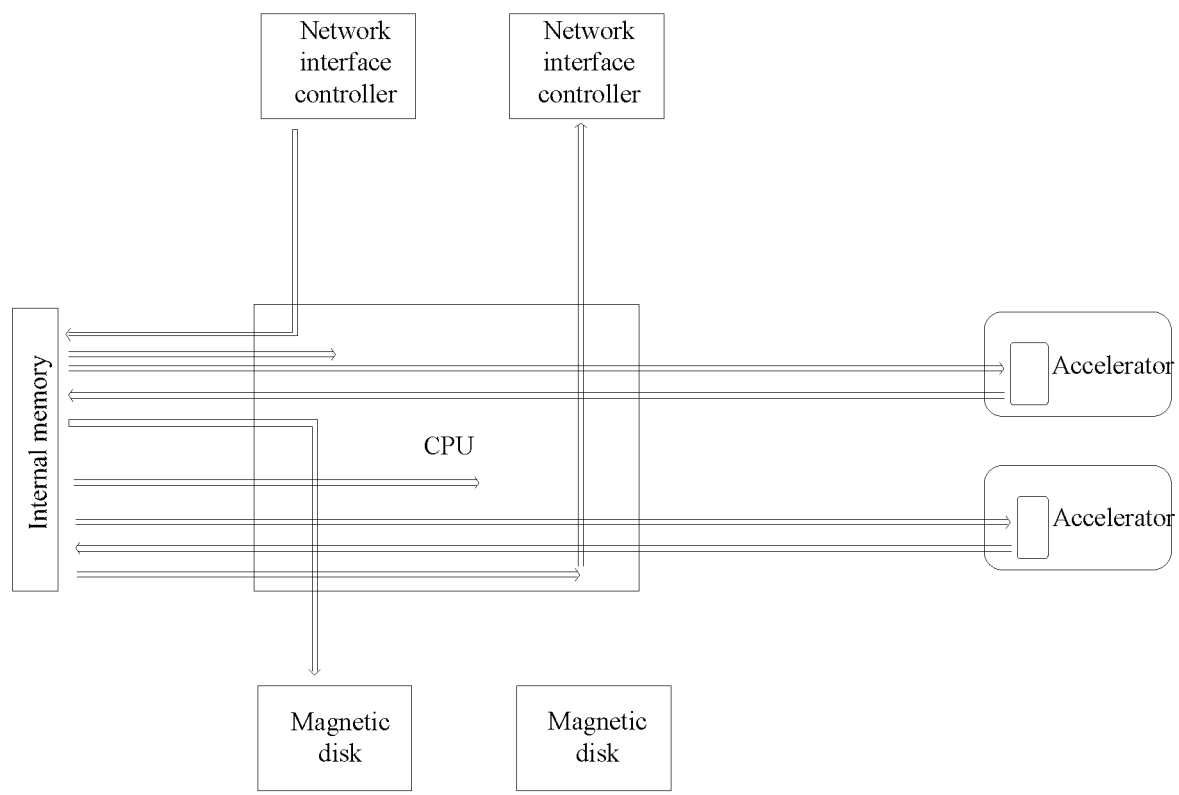
FIG. 3 is a flowchart of existing data processing centered on a CPU.

In some exemplary embodiments, as shown in FIG. 2 and FIG. 3, FIG. 3 is an existing flowchart of data processing centered on a CPU. Taking ①-⑤ being operations involved in data compression as an example, when data compression is performed in the related art, ① represents an operation that data is acquired from a network interface controller and stored in an internal memory, ② represents an operation that a CPU is notified that the internal memory has received the data, ③ represents an operation that the data is moved from the internal memory to one of accelerators to perform the data compression, ④ represents an operation that compressed data is returned to the memory, and ⑤ represents an operation that the compressed data is transported to a disk. It may be learned that access to the internal memory and data transport need to be constantly performed in the data compression process of the related art. In the embodiments of the present disclosure, the second DPU only needs to acquire the data message from the memory through the high-speed interconnection bus, and performs the data compression only by using an acceleration module built in the second DPU, without the need for frequent data transport and the need for an additional accelerator. Taking ⑥-⑨ being operations involved in data erasure as an example, ⑥ represents an operation that the internal memory notifies the CPU of the data stored in the memory, ⑦ represents an operation that the data is erased by using an external accelerator, ⑧ represents an operation that the erased data is stored in the internal memory, ⑨ represents an operation that the erased data stored in the internal memory is transported to the network interface controller through the CPU and sent through the network interface controller. It may be learned that access to the internal memory and data transport need to be frequently performed in the data erasure process of the related art. In the embodiments of the present disclosure, the second DPU only needs to acquire the data message from the memory through the high-speed interconnection bus, and performs data erasure only by using an acceleration module built in the second DPU, without the need for frequent data transport and the need for an additional accelerator. Of course, ①-⑤ and ⑥-⑨ may be any process in data processing. It may be learned from FIG. 2 that at least four or five times of access to the internal memory are required in only one data processing process. In the embodiments of the present disclosure, data sharing may be implemented through the high-speed interconnection bus, thereby reducing the number of times of data access and data transport.

It should be noted that the foregoing data processing may be implemented using the same second DPU, so as to reduce a quantity of deployed second DPUs and reduce the costs for the storage control node and data stream processing.

Of course, the encryption processing and compression processing may be combined on a data path so as to use one second DPU (implemented by using a built-in acceleration module) for implementation. To be specific, if both data encryption and data compression are required, the data encryption and the data compression may be combined and processed in the same I/O path, so that the I/O path is shorter and better. The foregoing erasure processing, deduplication processing, and data consistency protection processing may be performed by using one second DPU. Of course, alternatively, all of the foregoing processing may be respectively performed by different second DPUs.

The data stream processing method provided in an embodiment of the present disclosure may further include:

the CPU in the storage control node performs data forwarding control and storage management.

In the embodiments of the present disclosure, the CPU in the storage control node is responsible for relatively complicated control logic functions such as data forwarding control, storage reliability management, and storage system management. To be specific, in the embodiments of the present disclosure, by using a technology of separation of a data stream from a control stream, the CPU may perform control stream processing and minimal data processing, instead of whole data stream processing and control stream processing in the related art. Remaining data processing is implemented by the DPU in the storage control node, so as to reduce a processing pressure and processing workload on the CPU, improve the efficiency of data stream processing, and rapidly implement a fast I/O path.

An embodiment of the present disclosure also provides a storage control node. Refer to FIG. 2. The storage control node may include a first DPU and a second DPU.

The first DPU is configured to receive an I/O request, perform protocol offloading on the I/O request to obtain a data message, and store the data message in a memory.

The second DPU is configured to acquire the data message from the memory and perform data processing on the acquired data message.

In the storage control node provided in this embodiment of the present disclosure, the first DPU may be configured to determine a type of data contained in the data message, and store the data message in a corresponding memory according to the type of the data contained in the data message.

In the storage control node provided in this embodiment of the present disclosure, the first DPU may be configured to perform data fingerprint calculation on the data message to obtain a data fingerprint of the data message; and determine, based on the data fingerprint, the type of the data contained in the data message.

In the storage control node provided in this embodiment of the present disclosure, the first DPU may be configured to store the data message in the memory through a high-speed interconnection bus.

In the storage control node provided in this embodiment of the present disclosure, the second DPU may be configured to acquire the data message from the memory through the high-speed interconnection bus, and perform at least one of erasure processing, encryption processing, compression processing, deduplication processing, and data consistency protection processing on the acquired data message.

The storage control node provided in this embodiment of the present disclosure may further include a CPU.

The CPU is configured to perform data forwarding control and storage management.

An embodiment of the present disclosure also provides a nonvolatile readable storage medium. The nonvolatile readable storage medium stores a computer program. The computer program, when being executed by a processor, causes the processor to implement the following operations:

a first DPU receives an I/O request, performs protocol offloading on the I/O request to obtain a data message, and stores the data message in a memory; and a second DPU acquires the data message from the memory and performs data processing on the acquired data message.

The nonvolatile readable storage medium may include: various media on which program code may be stored such as a USB flash disk, a mobile hard disk, a Read-Only Memory (ROM), a Random Access Memory (RAM), a magnetic disk, or an optical disk.

For descriptions of relevant parts of the storage control node and the nonvolatile readable storage medium provided in the embodiments of the present disclosure, refer to the detailed description of the corresponding parts of the data stream processing method provided in the embodiments of the present disclosure, which are not described herein again.

It should be noted that in this specification, relationship terms such as "first" and "second" are merely used to distinguish one entity or operation from another, and do not necessarily require or imply that any actual relationship or sequence exists between these entities or operations. Moreover, the terms "include", "comprise", or any other variants thereof are intended to cover a non-exclusive inclusion, so that a process, a method, an article, or a device that includes a list of elements. In the absence of more constraints, an element defined by the statement "includes a . . . " does not preclude existence of an identical element in the process, method, article, or device that includes the element. In addition, a part that is of the foregoing technical solutions provided in the embodiments of the present disclosure and that has an implementation principle the same as an implementation principle of corresponding technical solutions in the prior art is not described in detail to avoid unnecessary redundancy.

The embodiments disclosed above are described to enable a person having ordinary skill in the art to implement or use the present disclosure. Various modifications to the embodiments are obvious to a person having ordinary skill in the art, and general principles defined in this specification may be implemented in other embodiments without departing from the spirit or scope of the present disclosure. Therefore, the present disclosure is not limited to the embodiments described in this specification but extends to the widest scope that complies with the principles and novelty disclosed in this specification.

What is claimed is:

1. A data stream processing method, wherein a storage control node comprises a first Data Processing Unit (DPU) and a second DPU, and the data stream processing method comprises:
   receiving, by the first DPU, an Input/Output interface (I/O) request, performing, by the first DPU, protocol offloading on the I/O request to obtain a data message, and storing, by the first DPU, the data message in a memory; and
   acquiring, by the second DPU, the data message from the memory and performing, by the second DPU, data processing on the acquired data message, wherein
   storing, by the first DPU, the data message in the memory comprises:
   determining, by the first DPU, a type of data contained in the data message, and storing the data message in a corresponding memory according to the type of the data contained in the data message.

2. The data stream processing method according to claim 1, wherein storing, by the first DPU, the data message in the memory comprises:
   storing, by the first DPU, the data message in the memory through a Peer-to-Peer (P2P) Direct Memory Access (DMA).

3. The data stream processing method according to claim 1, wherein acquiring, by the second DPU, the data message from the memory and performing, by the second DPU, the data processing on the acquired data message comprises:
   performing, by the second DPU, hardware acceleration on the data processing in a hardware manner by using a built-in data stream acceleration engine.

4. The data stream processing method according to claim 1, wherein storing, by the first DPU, the data message in the corresponding memory according to the type of the data contained in the data message comprises:
   selecting, by the first DPU according to storage reliability requirement corresponding to the type of the data contained in the data message, to store the data message in a Dynamic Random Access Memory (DRAM) or a Storage Class Memory (SCM), wherein storage reliability of the SCM is higher than storage reliability of the DRAM, and the memory comprises the DRAM or the SCM.

5. The data stream processing method according to claim 1, wherein determining, by the first DPU, the type of data contained in the data message comprises:
   performing, by the first DPU, data fingerprint calculation on the data message to obtain a data fingerprint of the data message; and
   determining, by the first DPU according to the data fingerprint, the type of the data contained in the data message.

6. The data stream processing method according to claim 1, wherein storing, by the first DPU, the data message in the memory comprises:
   storing, by the first DPU, the data message in the memory through a high-speed interconnection bus.

7. The data stream processing method according to claim 6, wherein acquiring, by the second DPU, the data message from the memory and performing, by the second DPU, the data processing on the acquired data message comprises:

acquiring, by the second DPU, the data message from the memory through the high-speed interconnection bus, and performing, by the second DPU, at least one of erasure processing, encryption processing, compression processing, deduplication processing, and data consistency protection processing on the acquired data message.

8. The data stream processing method according to claim 7, wherein performing the compression processing on the acquired data message comprises:
performing, by the second DPU, the data compression by using a built-in acceleration module.

9. The data stream processing method according to claim 7, wherein performing the erasure processing on the acquired data message comprises:
performing, by the second DPU, data erasure by using a built-in acceleration module.

10. The data stream processing method according to claim 7, wherein performing, by the second DPU, at least one of the erasure processing, the encryption processing, the compression processing, the deduplication processing, and the data consistency protection processing on the acquired data message comprises:
performing the erasure processing, the encryption processing, the compression processing, the deduplication processing, and the data consistency protection processing by using one same second DPU.

11. The data stream processing method according to claim 7, wherein performing, by the second DPU, at least one of the erasure processing, the encryption processing, the compression processing, the deduplication processing, and the data consistency protection processing on the acquired data message comprises:
performing the encryption processing and the compression processing by using one same second DPU; and
performing the erasure processing, the deduplication processing, and the data consistency protection processing by using another second DPU.

12. The data stream processing method according to claim 7, wherein performing, by the second DPU, at least one of the erasure processing, the encryption processing, the compression processing, the deduplication processing, and the data consistency protection processing on the acquired data message comprises:
performing the erasure processing, the encryption processing, the compression processing, the deduplication processing, and the data consistency protection processing by respectively using different second DPUs.

13. The data stream processing method according to claim 1, further comprising:
performing, by a Central Processing Unit (CPU) in the storage control node, data forwarding control and storage management.

14. The data stream processing method according to claim 1, wherein performing, by the first DPU, the protocol offloading on the I/O request to obtain the data message comprises:

performing, by the first DPU, operations comprising at least one of unpacking, parsing and verification on a data packet corresponding to the I/O request so as to obtain the data message.

15. A storage control node, comprising a first Data Processing Unit (DPU) and a second DPU, wherein
the first DPU is configured to receive an Input/Output interface (I/O) request, perform protocol offloading on the I/O request to obtain a data message, and store the data message in a memory;
the second DPU is configured to acquire the data message from the memory and perform data processing on the acquired data message; and
the first DPU is configured to determine a type of data contained in the data message, and store the data message in a corresponding memory according to the type of the data contained in the data message.

16. The storage control node according to claim 15, wherein the first DPU is configured to perform data fingerprint calculation on the data message to obtain a data fingerprint of the data message; and determine, based on the data fingerprint, the type of the data contained in the data message.

17. The storage control node according to claim 15, wherein the first DPU is configured to store the data message in the memory through a high-speed interconnection bus.

18. The storage control node according to claim 15, wherein the second DPU is configured to acquire the data message from the memory through a high-speed interconnection bus, and perform at least one of erasure processing, encryption processing, compression processing, deduplication processing, and data consistency protection processing on the acquired data message.

19. The storage control node according to claim 15, further comprising a CPU, wherein
the CPU is configured to perform data forwarding control and storage management.

20. A nonvolatile readable storage medium, wherein the nonvolatile readable storage medium stores a computer program, and the computer program, when being executed by a processor, causes the processor to implement the following operations:
receiving, by a first Data Processing Unit (DPU) in a storage control node, an Input/Output interface (I/O) request, performing protocol offloading on the I/O request to obtain a data message, and storing the data message in a memory; and
acquiring, by a second DPU in the storage control node, the data message from the memory and performing data processing on the acquired data message, wherein
storing, by the first DPU, the data message in the memory comprises:
determining, by the first DPU, a type of data contained in the data message, and storing the data message in a corresponding memory according to the type of the data contained in the data message.

* * * * *